No. 798,008. PATENTED AUG. 22, 1905.
H. C. BRAUN.
TELEGRAPH APPARATUS.
APPLICATION FILED JUNE 20, 1904.
10 SHEETS—SHEET 2.
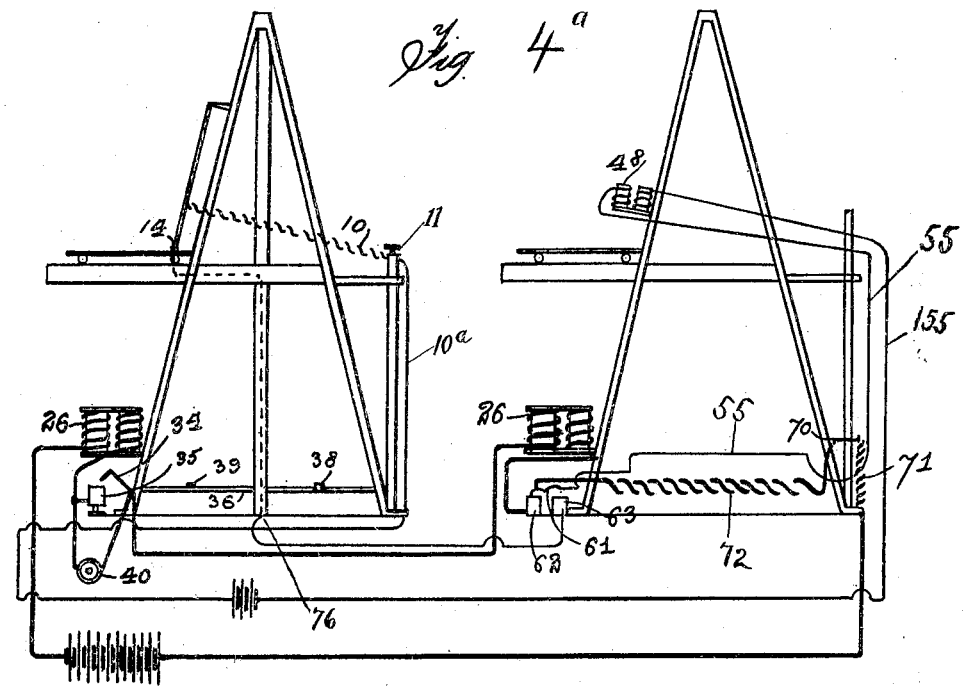
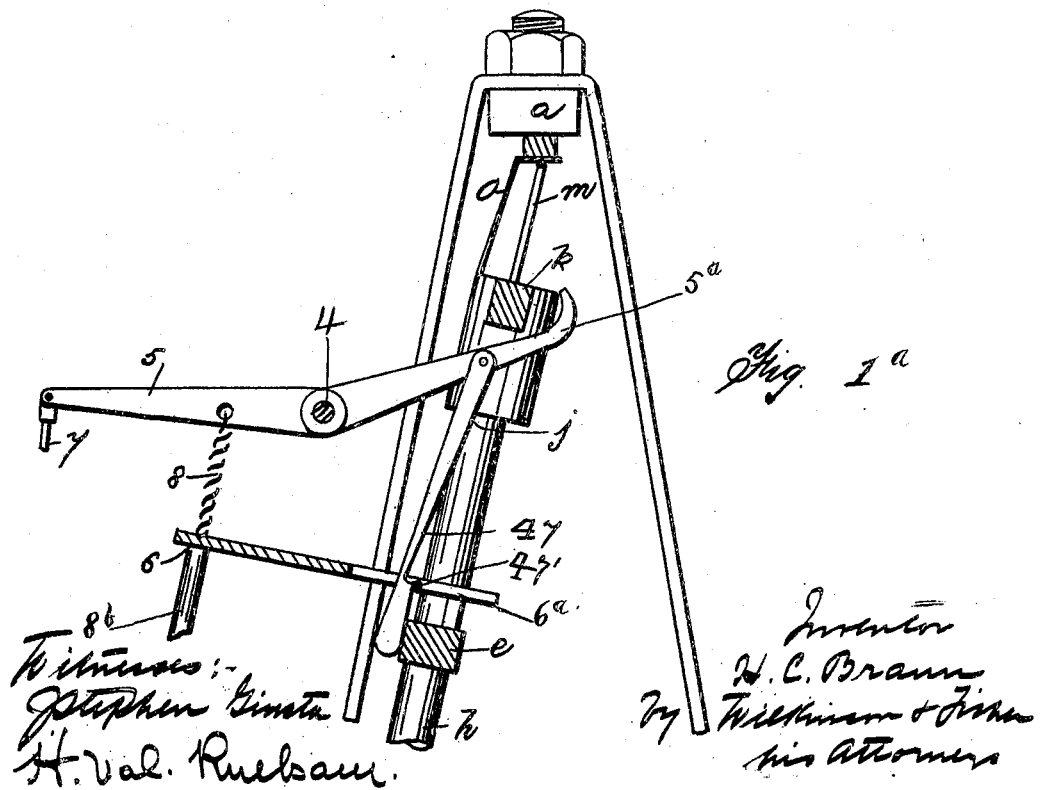

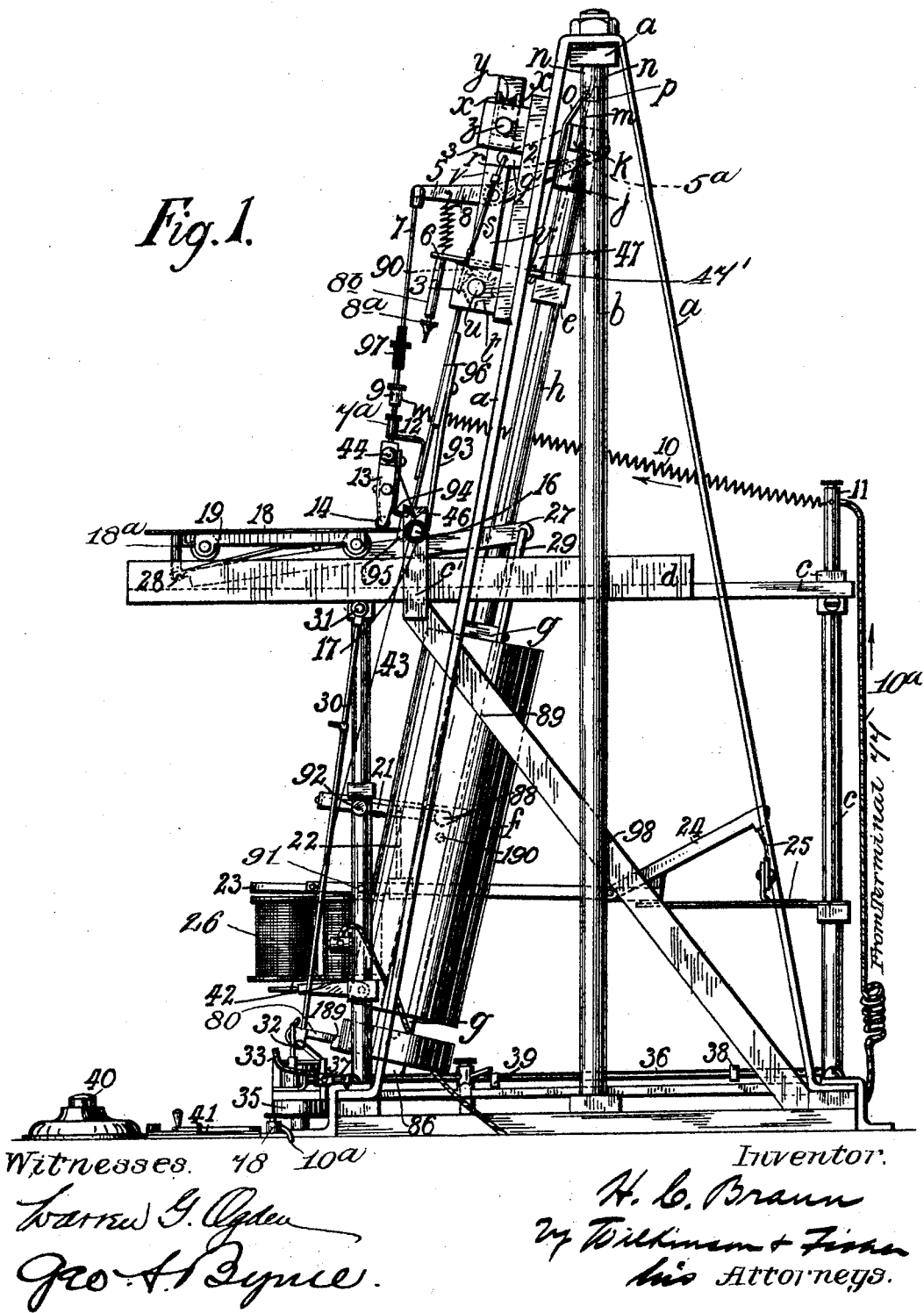

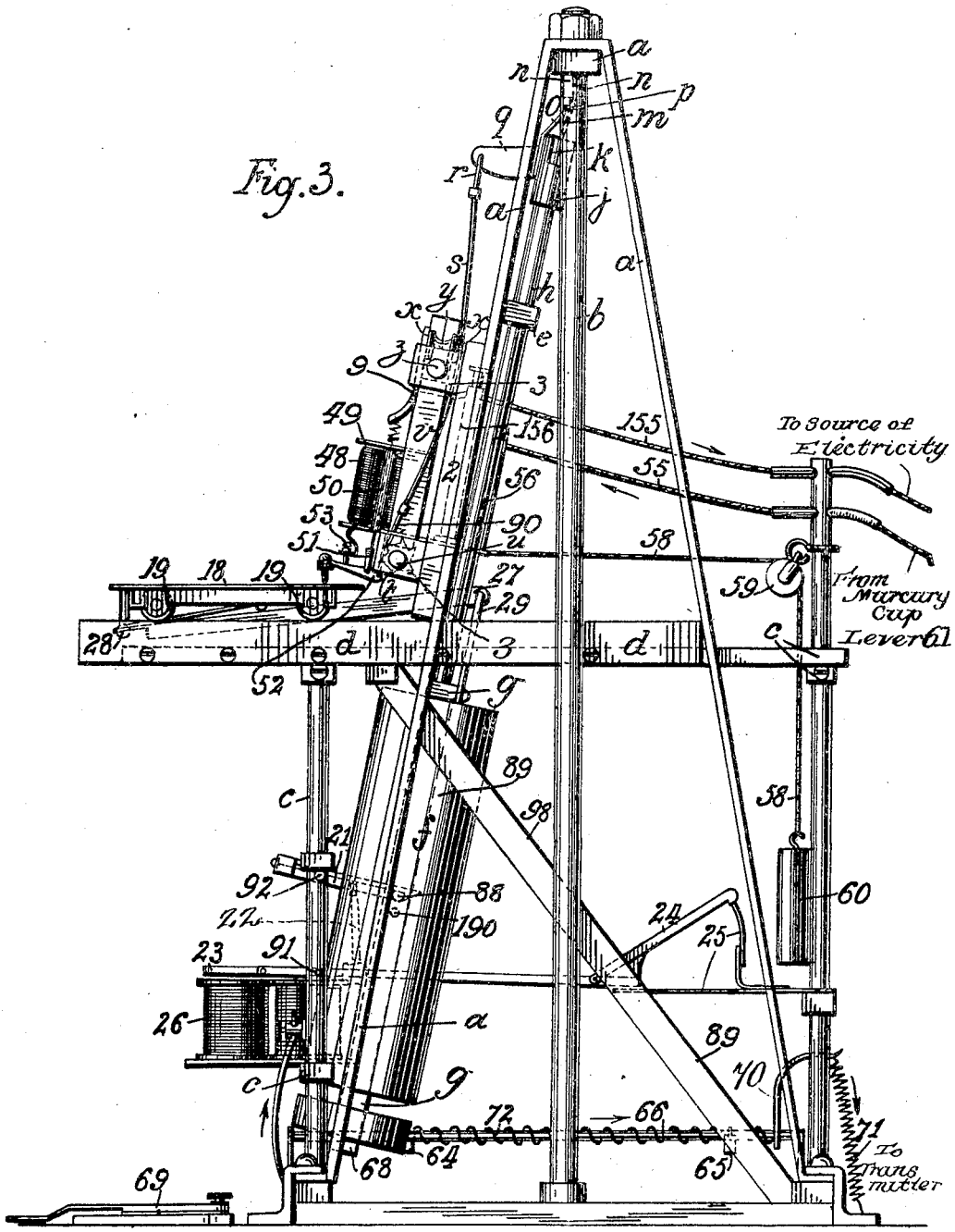

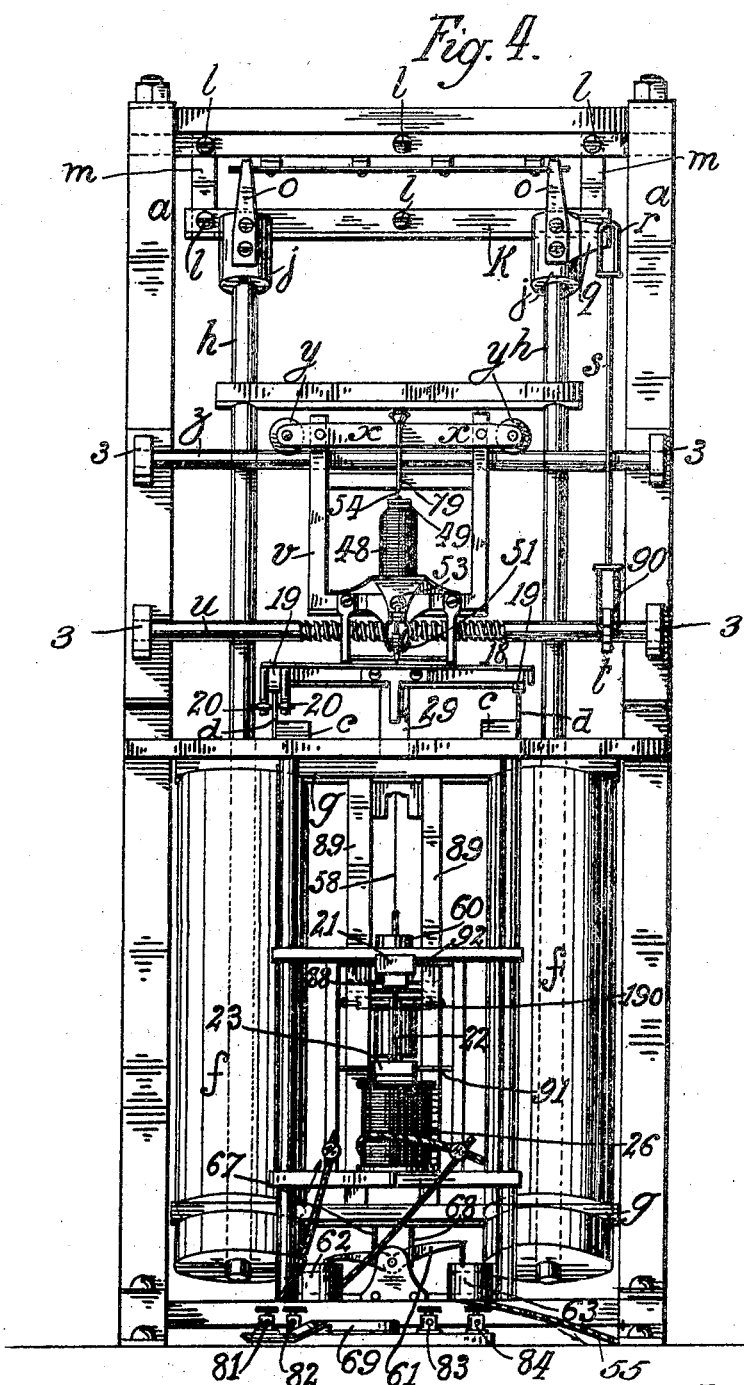

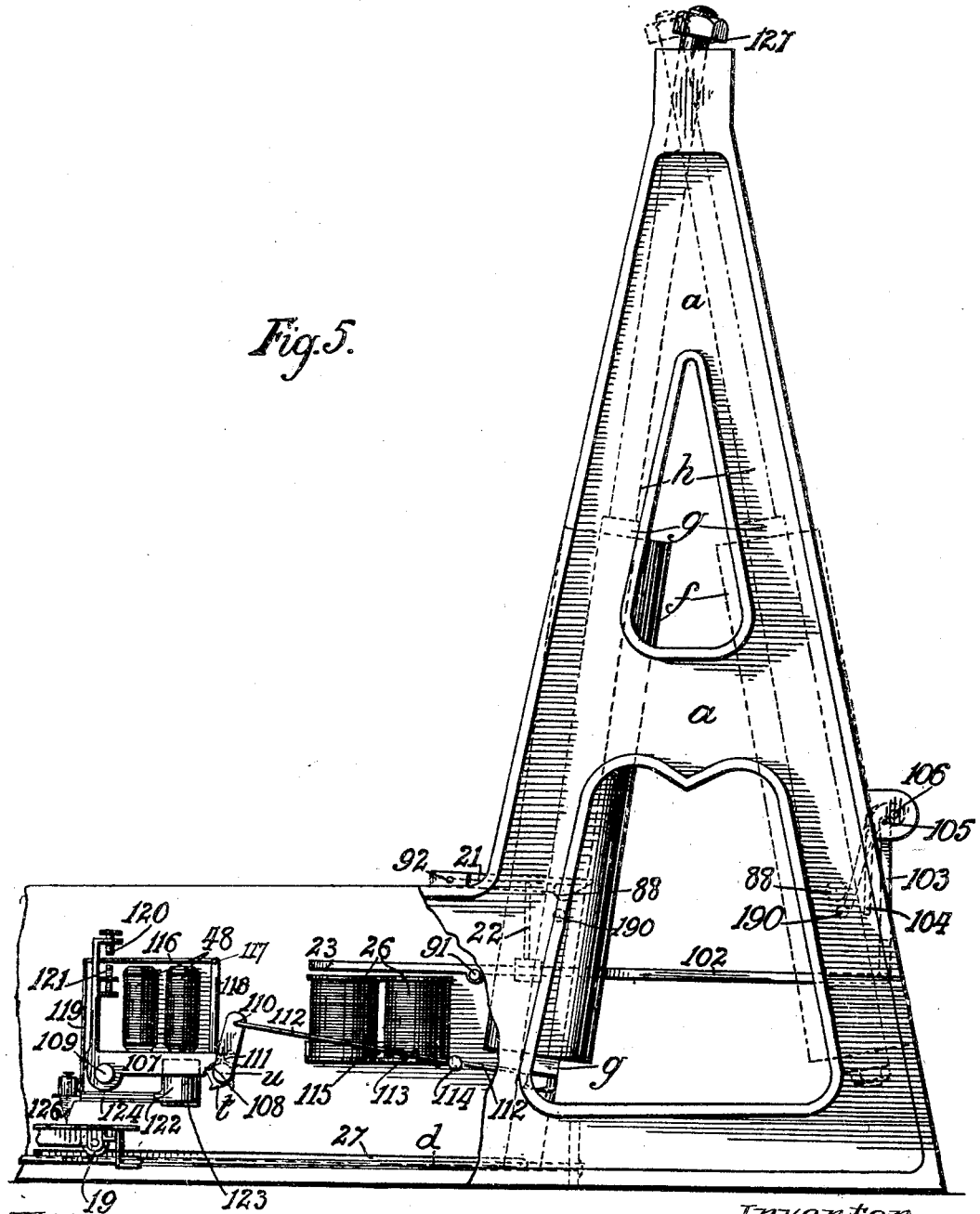

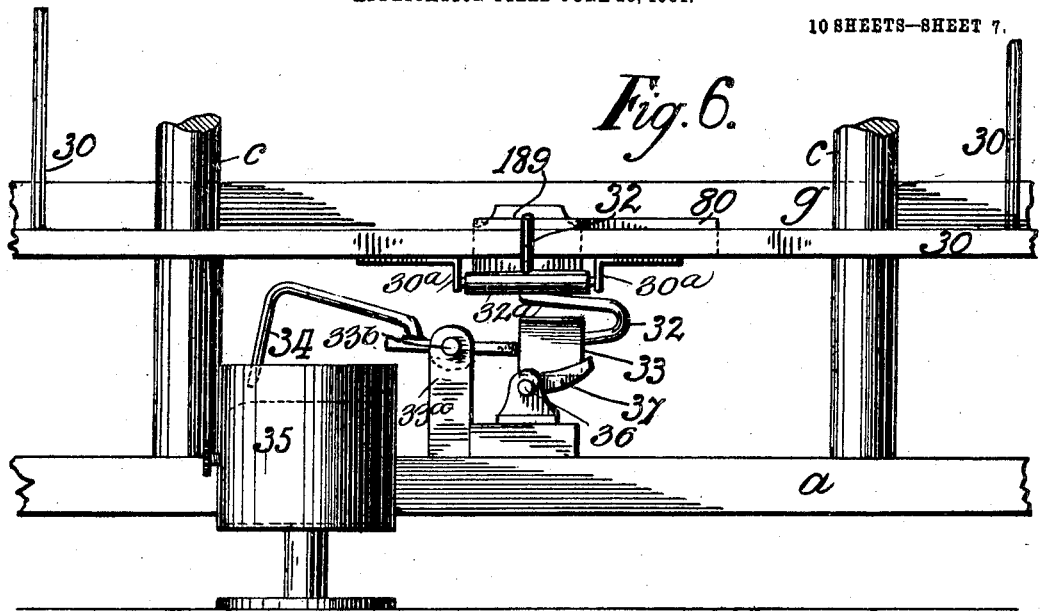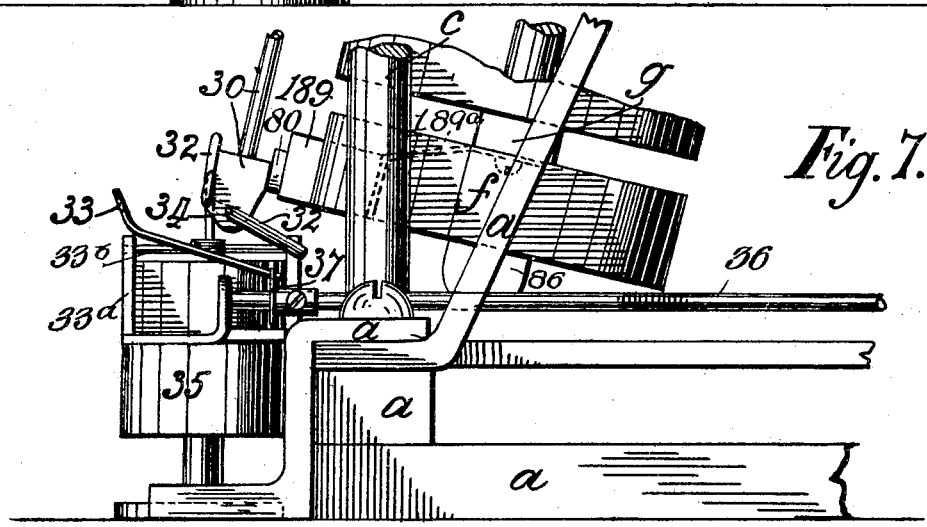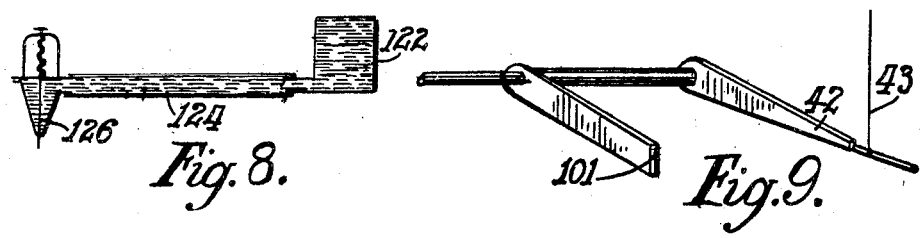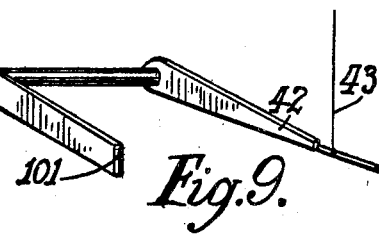

No. 798,008. PATENTED AUG. 22, 1905.
H. C. BRAUN.
TELEGRAPH APPARATUS.
APPLICATION FILED JUNE 20, 1904.
10 SHEETS—SHEET 8.
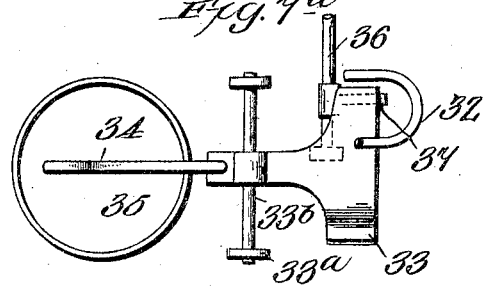
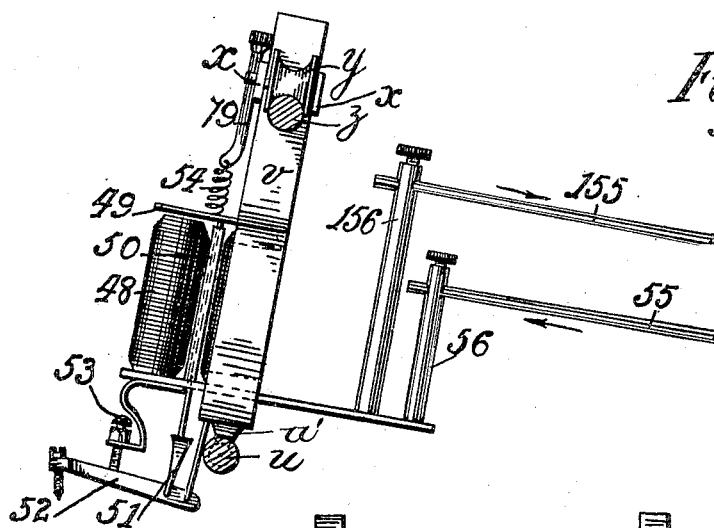
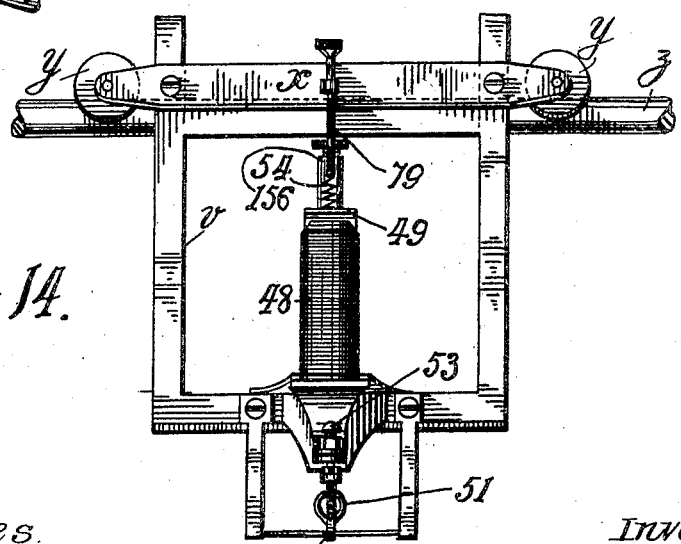

No. 798,008. PATENTED AUG. 22, 1905.
H. C. BRAUN.
TELEGRAPH APPARATUS.
APPLICATION FILED JUNE 20, 1904.

10 SHEETS—SHEET 9.

Witnesses
Warren G. Ogden
Geo. A. Pepper

Inventor
H. C. Braun
by Wilkinson & Fisher
his Attorneys.

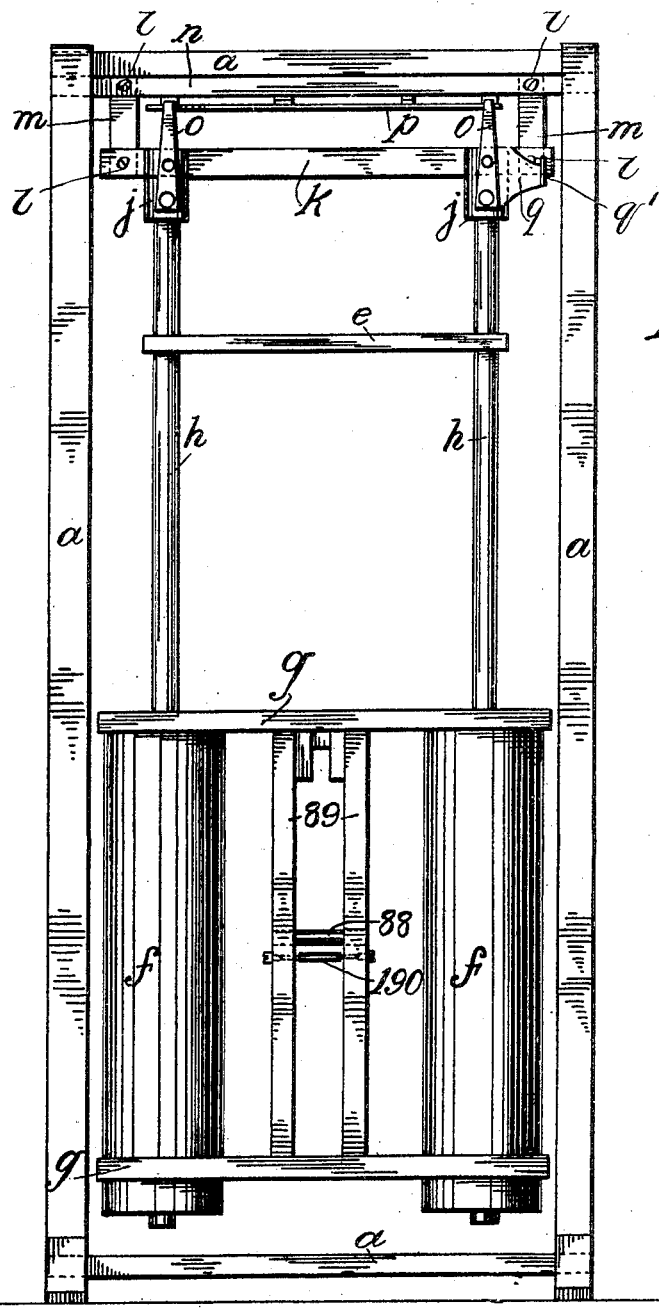

UNITED STATES PATENT OFFICE.

HENRY CHARLES BRAUN, OF BARNET, ENGLAND.

TELEGRAPH APPARATUS.

No. 798,008.  Specification of Letters Patent.  Patented Aug. 22, 1905.

Application filed June 20, 1904. Serial No. 213,363.

*To all whom it may concern:*

Be it known that I, HENRY CHARLES BRAUN, a subject of the King of England, residing at 8 The Avenue, Barnet, in the county of Hertford, England, have invented certain new and useful Improvements in Telegraph Apparatus; and I do hereby declare the following to be a full, clear, and exact description of the invention, such as will enable others skilled in the art to which it appertains to make and use the same.

This invention relates to telegraph apparatus, more particularly to telautographs; and the objects of the invention are to improve on the construction of such apparatus and improve their efficiency, more particularly for the transmission of maps, sketches, designs, photographs, and the like, as well as of messages, by means of electricity.

To the accomplishment of these objects and such others as may hereinafter appear the invention comprises the novel construction and combinations of parts hereinafter described, and particularly pointed out in the appended claims, reference being had to the accompanying drawings, showing the preferred embodiment thereof, in which—

Figure 2:
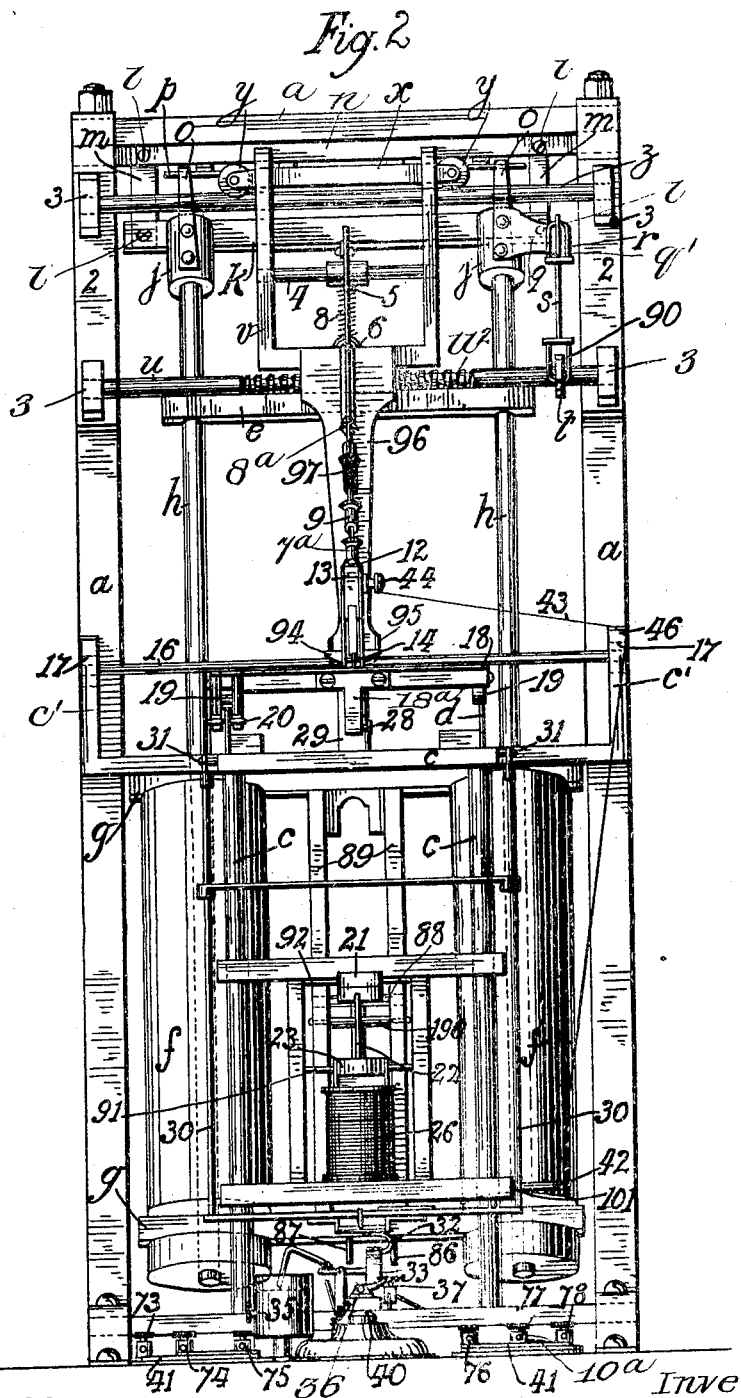
Figure 10:
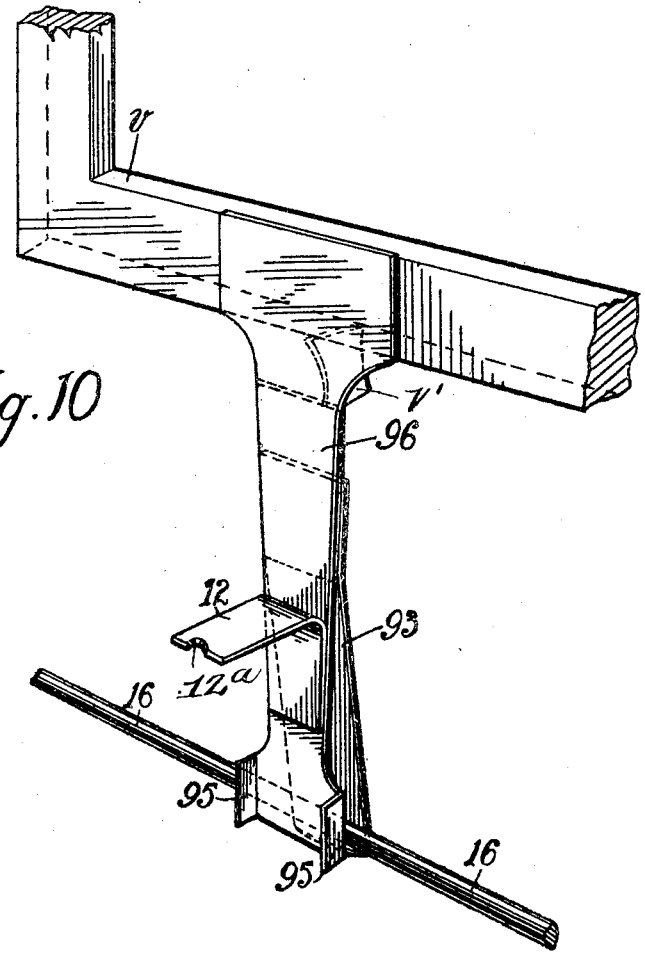
Figure 11:
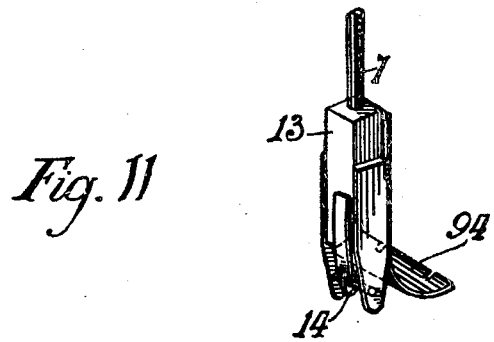

Figure 1 shows a side elevational view of one form of the transmitting instrument of my apparatus. Fig. 1$^a$ is a fragmentary view in detail of the upper portion of the transmitting-pendulum, showing the mechanism for holding the style in its inoperative position during the return stroke of the pendulum. Fig. 2 shows a front elevational view of Fig. 1. Fig. 3 shows a side elevational view of one form of the receiving instrument of my apparatus. Fig. 4 shows a front elevational view of Fig. 3. Fig. 4$^a$ is a diagrammatic view illustrating the motor and writing-circuits coöperating between the transmitting and receiving instruments. Fig. 5 shows a side elevational view of a modified form of receiving instrument, the essential portions of the construction being also applicable to a transmitting instrument. Fig. 6 shows an enlarged detail of the lower portion of Fig. 2. Fig. 7 shows an enlarged detail of the lower portion of Fig. 1, being a side elevational view of Fig. 6. Fig. 7$^a$ shows a plan view of a portion of the detail shown in Figs. 6 and 7. Fig. 8 shows a detail view of the preferred form of stylus used on the modified receiving instrument shown by Fig. 5. Fig. 9 shows an enlarged detail in perspective of the shut-off device for breaking the electrical connection when the work is completed. Fig. 10 shows an enlarged detail in perspective of the mechanism for holding and guiding the stylus of the transmitting instrument. Fig. 11 shows an enlarged detail in perspective of the preferred form of roller-stylus used on the transmitting instrument. Fig. 12 shows a detail front elevational view of the pendulums and method of hanging the same. Fig. 13 shows an enlarged detail, in side elevation, of the receiving apparatus of Fig. 3 and its controlling mechanism; and Fig. 14 shows a front elevational view of Fig. 13.

The invention consists, essentially, of two instruments of approximately similar design and construction, disposed in operative connection with each other in any suitable way for transmitting and recording intelligence. One of the instruments may be arranged as a transmitter to hold written, drawn, printed, stenciled, or other sketches, designs, or writing produced by preference upon paper by means of ink, which is a conductor of electricity. The second instrument, which may be used as the receiver, is intended to produce in substantial facsimile the writing, drawing, printing, or the like upon the paper in the transmitting instrument.

In carrying out the invention the instruments are provided with pendulums which are so controlled that they act synchronously. The pendulums are locked at rest and started on both instruments by the same electrical impulse, and both receive a second and common impulse to bring them back to their starting-point, where they are relocked, suitable mechanism being provided to obtain the desired periodicity and uniformity of these impulses in both instruments.

Each instrument is also provided with a table and running carriage controlled by the pendulum and adapted to move freely in a horizontal plane by preference by means of a link or lever attached to the pendulum-rod.

Above the table of the transmitting instrument is a stylus, roller, brush, or other device for conducting the current, such conductor having a transverse motion at right angles to the plane of motion of the table.

In the receiving instrument the stylus is replaced by an electromagnet having an armature coupled directly or indirectly to a rod or shaft in such a manner that when the current passes into the coils the armature is attracted and drawn downward, pressing a stylus or the like with a sudden blow upon the table over which it is suspended.

Referring to the drawings, in which the same letters and numerals of reference are employed to denote the same parts throughout the several views, and more particularly to those figures which disclose the transmitting instrument, $a$ is the main frame thereof, supported on vertical stanchions $b$ and provided with an inner horizontally-disposed frame $c$, supported and strengthened by a diagonally-arranged stay 98.

Depending from the upper portion of the frame $a$ and extending downwardly between the sides of inner frame $c$ is a pendulum consisting of two weights $f$, connected rigidly together by cross-bars $g$, mounted on a pair of rods $h$, which are also connected rigidly together by a cross-bar $e$. The means of suspension consist of clamps $j$, (see particularly Fig. 12,) mounted on the upper end of each rod $h$, in which clamps are securely mounted by screws or other suitable means a pair of cross-bars $k$, which act as a transverse clamp and hold securely the lower ends of two flat steel springs $m$, the upper ends of which are securely held in a similar manner between the cross-bars $n$, set on the frame $a$. Screws $l$ may be used to securely hold the springs $m$ in position. To the clamps $j$ are secured two tongues $o$, preferably of steel, the upper or free ends of which bear against a bar $p$, depending from but connected rigidly to the transverse pieces $n$.

On the upper side of the inner frame $c$ are two rails $d$, on which runs a carriage 18, mounted on wheels 19, grooved or otherwise suitably formed. The carriage 18 is also provided with suitable guide rollers or wheels 20, which run on each side of one of the rails $d$ for the purpose of steadying the carriage, Fig. 2. Depending from the forward end of the carriage is a lug or ear $18^a$, provided with a pin 28, which has pivotally attached to it one end of a link 27, passing underneath the carriage and pivotally attached at its other end to a forked piece 29, which in turn is secured to the framework connecting the rods $h$ and weights $f$. It is thus seen that the carriage 18 follows all the movements of the pendulum.

On the forward side of the frame $a$ are mounted two plates 2, carrying fixed bearings 3, through which run two transverse rods $z$ and $u$, preferably of circular cross-section. On rod $z$ run a pair of grooved wheels $y$, connected together by any suitable means, as a pair of bars $x$, and depending from said connecting means is a frame $v$, in which is mounted a spindle 4, carrying a lever 5, having an upwardly-bent hooked arm $5^a$. (See Figs. 1 and $1^a$.)

Extending forwardly from the bottom portion of the frame $v$ is a plate or lug 6, which is flexibly connected to the bent lever 5 by a helical spring 8, the tension of which is adjusted by means of a milled nut $8^a$, working in a sleeve $8^b$. To the outer end of lever 5 is pivoted a rod 7, on the lower end of which is secured a conducting-roller 14, mounted in a forked frame 13, Figs. 1, 2, and 11, the tension of the spring 8 being such that said roller rides upon the surface of carriage 18.

Mounted above carriage 18 and transversely thereof is a rod 16, having bearings in uprights $c'$ of the frame $c$ and electrically insulated from the main frame by suitable collars 17. Depending from the lower part of frame $v$ is a plate 96, which is widened at the bottom and the edges turned outwardly, as at 95, Fig. 10, forming a guide resting on the forward side of rod 16, in which slides a guide-piece 94, Fig. 11, attached to frame 13, in which the conducting-roller 14 is mounted. Plate 96 is kept in engagement with rod 16 by means of a spring 93, secured to the back of said plate and taking behind said rod. On the forward side of plate 96 is mounted a bracket 12, provided with a notch $12^a$, Figs. 1, 2, and 10, in which the rod 7 rides. The vertical travel of rod 7 is limited in its upward movement by the enlarged frame 13 engaging with the bracket 12 and in its downward movement by a nut $7^a$ engaging with said frame, Fig. 1.

Above nut $7^a$ is mounted a sleeve 9 in the form of a binding-post, to which is attached one end of a coiled wire 10, Fig. 1, which passes to binding-post 11, suitably insulated from the main frame, and there joins an insulated wire $10^a$, which leads to binding-post 77 at the front of the instrument, Fig. 2. The portion of the rod 7 carrying the sleeve 9 is insulated from the lever 5 and parts connected thereto in any suitable manner, as at 97.

As the pendulum swings the roller 14 is made to travel transversely of the carriage 18 by means of the following mechanism: The shaft $u$ has cut thereon a thread $u'$, Fig. 2, and from the lower part of frame $v$ there depends a transversely-disposed plate with respect to the frame, having a knife-edge $v'$, Fig. 10, which engages the thread. From one of the clamps $j$ there extends an arm $q$, which has its end bent at right angles, forming an ear $q'$, Figs. 1, 2, and 12. Depending from this ear is a rod $s$, held thereon by any suitable means, as a loop $r$, the lower end of the rod being provided with another loop or suitable engaging means 90 for a ratchet-wheel $t$, keyed fast on the shaft $u$. It is thus readily seen that as the pendulum swings the rod $u$ is revolved and the thread $u'$, engaging with edge $v'$, moves the frame $v$, carrying the roller 14 transversely on the rod $z$.

In order that the roller 14 may be in engagement with the carriage 18 only on the backward stroke, the rearwardly and upwardly extending portion of lever 5 is made of such a length that when the pendulum reaches the end of the backward stroke the bar $k$ will impinge against and depress the lever 5, and thus raise rod 7 and roller 14. In order to hold the roller in this raised position on the forward stroke, a depending hooked rod 47, Figs. 1 and 1ª, is attached to lever 5, and when said lever is depressed said rod engages with a pin 47', extending across a slot 6ª, cut in the plate 6.

The preferred means employed for locking the pendulum in a position of rest, releasing it therefrom for starting the apparatus in operation, giving it a continuous movement, and finally shutting off the actuating means, and thereby stopping the movement when the particular work has been completed, will now be described.

At 26 are shown the coils of an electromagnet provided with an armature 23, pivoted to the frame $c$ at 91. On the armature is mounted a pin 22 in such position that it is raised when said armature is attracted by the current passing through the coils. Pivoted to a bar 92, forming part of the frame $c$, in such position as to be engaged by pin 22 when raised, is a rod 21, provided with a hook on its inner end adapted to engage with a short bar 88, arranged between two rods 89, which extend between the two cross-bars $g$, connecting the weights $f$, Figs. 1, 2, and 12.

In Fig. 1 the pendulum is shown in locked position. Between the bars 89, slightly below the rod 88, is mounted a suitable antifriction device, as a roller 190. The rear end of the armature 23 extends upwardly, as at 24, forming a species of inclined plane on which roller 190 rides at the back of the stroke of the pendulum. A spring 25 is arranged under the rear end of armature 23, being attached to frame $c$ at a convenient point, and thus limits the movement of the armature and keeps its forward end within a working distance of the electromagnet 26.

Pivoted to the frame $c$ at 31 is what may be termed a "swinging" frame 30, the lower end of which is shown in detail in Figs. 6 and 7. Attached to the lower end of frame 30 are brackets 30ª, between which is loosely mounted a bar 32ª, through which passes a rod bent into a hook 32 on its lower end. Below the frame 30 and hook 32 on the frame $a$ is mounted a pair of supports 33ª, carrying a spindle 33ᵇ, on which is mounted a lever having one end in the form of a hook 34, extending in a direction substantially at right angles to spindle 33ᵇ, and the other in the form of an inclined plate 33, extending in a direction substantially parallel to spindle 33ᵇ, the forward end being curved upwardly and normally resting in a position higher than the rear end, Fig. 7. Below the hooked end 34, Figs. 6, 7, and 7ª, is situated a mercury-cup 35. The lever 33 34 and mercury-cup 35 are on a circuit with a push-button 40 and switches 41 for connecting said circuit with any desired source of electricity. Extending from front to rear of the instrument and suitably journaled therein, with its forward end below the pan-shaped end 33 of lever 33 34, is a rocking rod 36, carrying a pawl 37 immediately under the rear end of plate 33, (see particularly Fig. 7ª,) so that an upward movement of the pawl will force hook 34 downwardly and into the mercury-cup 35, completing the circuit. On the rocking rod 36 at convenient points are lugs or bosses 38 and 39, Fig. 1, against which ears or tailpieces 87 and 86, depending from lower cross-bar $g$, Fig. 2, are adapted to strike as the pendulum swings backward and forward, respectively. These bosses are arranged so that the rod 36 is rocked so as to make contact by means of pawl 37 on each backward stroke of the pendulum and break it on each forward stroke. From between these ears or tailpieces 86 and 87 there extends forwardly a spring 189ª, (shown in dotted lines, Fig. 7,) the rear end being securely attached to cross-bar $g$ and carrying on its outer end a buffer-block 189, adapted to contact with a spring 80, Figs. 1, 6, and 7, on the rear side of the lower part of swinging frame 30, when the pendulum is at the end of its forward stroke. At the proper time contact between the pendulum and swinging frame is prohibited by means of a lever mechanism 42, Figs. 1, 2, and 9, suitably pivoted to frame $c$ in such position that stop 101 may engage with said swinging frame when in certain positions. Lever 42 is supported from a button 44, Figs. 1 and 2, on the frame of roller-stylus 14 by means of a cord 43 passing through a convenient groove 46 in upright $c'$ of the frame $c$. In the drawings this is so illustrated that the outer edge of the member 101 will (when the cord 43 has become sufficiently slack by the movement of the style from the left to the right of the transmitting instrument) fall into a position disposed in the path of swing of the lower cross-bar of the frame 30.

Referring to the receiving instrument, which is shown at Figs. 3 and 4, those parts marked with similar letters and numerals to the parts already described with reference to the transmitting instrument are similar in every respect to such parts in that instrument.

With regard to the details in which the receiving instrument differs from the transmitting instrument, 48, Figs. 13 and 14, shows an electromagnet rigidly fixed in the frame $v$. An armature 49 is set in a convenient position above the magnet-cores and has attached to it a shaft running through a vertical tube 50 between the magnets. The shaft passing through the tube 50 carries a fork 51, which raises and lowers a stylus-lever 52, suspended immediately over the running carriage 18. An adjusting-screw 53 is carried by a bracket and regulates the height of the stylus-lever 52. Attached to the armature 49 and to the bent piece 79 is a spring 54 for the purpose of adjusting the armature 49. Wires 55 and 155 are connected to the magnet-coils through binding-posts 56 and 156, respectively. As in the case of the transmitter, a knife-edge $u'$, Fig. 13, is attached to the lower part of the frame $v$ for engaging in the thread on the rod $u$. This knife-edge is kept in engagement with the thread by means of the tension of cord 58, running over pulley 59 and provided with a weight 60.

Beneath the pendulum and at the forward part of frame $a$ is a rocking lever 61, Fig. 4, fixed to, but insulated from, the frame and provided with contacts to dip alternately in mercury-cups 62 and 63. This lever is rocked by means of a rod 66, suitably mounted on the frame and furnished with lugs or bosses 64 and 65, against which strike ears or tail-pieces 67 and 68, depending from lower cross-bar $g$ of the pendulum, as in the case of the transmitting instrument. At the rear end of rod 66 is fixed a piece 70, to which is attached a coiled wire 71, attached to the base of frame $a$. Piece 70 is in connection with lever 61 through a wire 72, coiled about rod 66, which allows freedom of action to said lever.

Terminals on the transmitting instrument are indicated by 73 to 78, Fig. 2, and on the receiving instrument by 81 to 84, Fig. 4.

The operation of the entire apparatus is as follows: Before starting the apparatus the drawing, writing, or the like which it is required to transmit is written or drawn upon a sheet of paper by means of an ink which is a conductor of electricity and is then securely attached, by means of clamps or otherwise, to the table of the carriage 18. This carriage 18 is then attached to link 27. A second sheet of paper, blank and preferably covered by a carbon-paper, is similarly attached to the table of the receiving instrument.

For the sake of simplicity the actuation of the pendulums will be first described. Referring to the transmitter, at starting the pendulum is locked in the forward position by the hook 21 taking over the rod 88. The button 40 is now pressed, which closes the main circuit between the mercury-cup 35 and the rocking lever 33 34. I term this main circuit the "driving" or "motor" circuit to more conveniently distinguish from an auxiliary circuit, herein referred to as the "writing-circuit." The current passes through the coils of the magnet 26, and the armature 23 is attracted, forcing up the vertical pin 22, thus releasing the hook 21, when the pendulum is free to swing toward the back of the instrument. The button is immediately released and of course the connection broken at once. On reaching the back of the stroke the boss 38 is struck by the projecting tail piece 87. This causes the rod 36 to rock over, raising the pawl 37, which in turn raises the plate 33, which causes the contact-point 34 to dip into the mercury-cup 35 and again remain for a certain length of time in electrical connection. The current is thus again enabled to pass through the coils of the magnet 26, and the armature 23 is again attracted. The effect of this is to raise the backward extension of the said armature and force the inclined portion 24 upward. At this moment the roller 190 on the pendulum is in contact with the said inclined piece 24, and the pendulum is given a push, which adds sufficient momentum to enable it to return to its former position, when the hook 21 reëngages with the rod 88 and locks it in position. During the return stroke of the pendulum the tail-piece 86 strikes the boss 39, rocking over the rod 36, thus depressing the pawl 37 and allowing the plate 33 to fall and the point 34 to rise.

It is not necessary to again press the button 40, as the cycle is continued automatically in the following manner: On the pendulum swinging back to its front position the swinging frame 30 is struck by the buffer-block 189 coming in contact with the spring 80 on the said frame. The result is that the said frame 30 is given an impetus outward and the hooked end of the member 32, carried thereby, contacting the upper face of the plate is swung rearwardly on its axis $32^a$, passing idly over and beyond the upper surface of plate 33 on the forward stroke, while on the return stroke, having fallen to its normal position, it is passed along the under surface of said plate, thereby raising the latter and plunging the contact-point 34 into the mercury-cup 35, again completing the circuit and releasing the hook 21 for the next beat of the pendulum. The cycle of operations thus continues, the carriage 18 being actuated backward and forward by each stroke of the pendulums.

Referring to the receiving instrument, at the moment when the impulse releases the hook 21 on the transmitter the electric current passes from a suitable source of power, which I will designate the "main battery," to the receiver, passing in at the terminal 82, thence to the terminal 81, thence around magnet 26 of the receiver, down to the mercury-cup 62, through the lever 61, along the wire 72, conductor 70, and wire 71, and so out of the instrument and back through main battery to the transmitter. As the pendulum in the receiver swings toward its backward position the tailpiece 68 strikes the boss 64 and rocks the lever 61 over and breaks the contact between the said lever and the mercury-cup 62 and makes contact between it and the mercury-cup 63. This throws the writing-circuit into action, as will be hereinafter explained.

As the pendulum approaches the back of the stroke the tailpiece 67 strikes the boss 65 and restores the contact-lever 61 to its original position (shown in Figs. 4 and $4^a$) in time for the second electrical impulse at the end of the backward stroke to pass through the motor-circuit, and the pendulum returns to its locking position, as described in the case of the transmitting instrument.

The transverse movement of the transmitting-stylus is accomplished in the following manner: At the commencement of operations the knife-edge $v'$ is disengaged from the thread $u'$ on the shaft $u$ and the frame $v$ then pushed to the left-hand side of the machine. It is then again set so that the knife-edge engages with the thread on the shaft $u$. As the pendulum swings backward the loop 90 passes over a tooth of the ratchet-wheel $t$, and on the return stroke the movement of the ear $q'$ pulls the ratchet-wheel round for a certain distance, thus rotating the shaft $u$ and thread $u^2$ and moving the carriage $v$ transversely. At the next backward swing of the pendulum the loop 90 engages another tooth of the ratchet-wheel, and the action continues until the slack of the cord 43 allows the lever 42 to fall sufficiently for the piece 101 to come into position in the path of swing of the lower crossbar of the frame to stop the action of the swinging frame 30, thus preventing any further contacts being made, and so stopping the machine.

The contact-roller 14 is in contact with the paper when the carriage 18 is running from the front to the back; but during the return of the carriage to the front—that is, on the forward stroke of the pendulum—the roller 14 is raised from the surface of the paper by the mechanism consisting of lever 5, hook 47, plate 6, &c., heretofore described. When the pendulum reaches the end of its forward stroke, the impact throws the hook 47 out of engagement with the pin 47' in the plate 6 and the stylus is again lowered, the roller 14 thus again coming into contact with the paper. It is thus seen that by the combined transverse motion of the stylus and reciprocating motion of the carriage the roller 14 is caused to traverse every portion of the paper clamped upon the carriage of the transmitting instrument.

Referring to the receiving instrument, the frame $v$ is set and caused to travel transversely in a similar manner to the corresponding frame on the transmitter, and thus the receiving-stylus is caused to cover the same amount of space on the receiving-table as the transmitting-stylus does on the transmitting-table. When boss 64 on rod 66 is hit, the magnet 48, being in circuit, is excited, and it attracts the armature 49, giving it a downward pull, and the stylus is thereby brought down upon the paper on the receiving-carriage 18. The writing or design is thus reproduced on the paper in the receiving instrument by means of the sheet of carbon-paper covering the blank sheet, or the reproduction may be by means of a pen, pencil, or the like.

As previously stated, the writing-circuit is complete while the rocking lever 61 is dipping into the mercury-cup 63. The current then passes from the auxiliary source of electricity, termed the "auxiliary battery," to the transmitting instrument, entering at the terminal 78, passing thence to the terminal 77, thence through the wire $10^a$ to the binding-post 11, along the coiled wire 10, through lower end of rod 7 to the stylus-roller 14, through the conducting-ink to the table, and thence through the frame of the instrument, (indicated by dotted lines in Fig. $4^a$,) leaving the instrument at the terminal 76, thence to the receiving instrument, entering at the terminal 84, thence to the terminal 83, from there to the mercury-cup 63, thence to the lever 61, through its contact-point, when the circuit is closed, thence to the wire 55, connected to the lever 61, and through binding-post 56, Fig. 13, thence to the coils of the magnet 48, thence through binding-post 156 and wire 155 back to the auxiliary source of electricity.

It will be understood that the writing-circuit is only closed while the pendulum in the receiver is describing the portion of its path between the bosses 64 and 65, and also the motor-circuit is only closed momentarily at the beginning and end of its rearward stroke, the parts so coöperating that during the rearward stroke of the pendulum the writing-circuit is closed when the main circuit is broken, and vice versa, and during the forward or return stroke of the pendulums both circuits are broken.

In the several views of the drawings the main or motor circuit is shown in heavy lines, while the auxiliary or writing circuit is shown in light lines, and in Fig. $4^a$ these circuits are traced in a simple diagrammatic form for facilitating their comprehension. It is of course obvious that in practice, if desirable, I may introduce a relay, and also instead of using return-wires I may employ the earth as a conductor.

A modified form of the receiving instrument is shown by Fig. 5, the main difference being that the tracks for the sliding carriage are placed below the pendulum-weights, in which position the length of travel is enabled to be increased, and thus larger pieces of work may be copied.

In this modification the following means are adopted for giving fresh momentum to the pendulum at the back of the stroke: In this case the armature 23 of the magnet 26 has a backward extension 102, to which is pivoted a link 103. To the frame $a$ is pivoted an arm 104 at 105. To the arm 104 the link 103 is also pivoted at 106. It is readily seen that when the armature 23 is attracted the tail end 102 pushes the link 103 upward, and through this connection the arm 104 is pushed against the roller 190 on the pendulum, thus communicating the increased momentum to it.

The writing-stylus is caused to travel transversely in the following manner: In place of the frame $v$ a carriage 107 is provided. This slides on a rod 109 and is provided with a knife-edge 108, resting on a rod $u$, provided with a screw-thread. This rod is actuated by means of a ratchet-wheel $t$, which is situated between the arms of a forked piece 110, pivoted at the end of the shaft and constructed with a pawl 111, adapted to engage ratchet $t$. Attached to the forked piece 110 is one end of a rod 112, which slides through a rod 114, passing transversely across the instrument, and is furnished with a helical spring 113 between the rod 114 and a fixed pin 115. When the pendulum is at the front of its stroke, it engages and pushes the rod 114 forward, and the pawl 111 actuates the ratchet-wheel $t$. When the pendulum swings away, the rod 114 resumes its former position and is ready to again actuate the ratchet-wheel. The armature 116 is pivoted at 117 to a vertical rod 118 at the back of the carriage 107 and carries at the end remote from the pivot a vertical rod 119, attached to the stylus. The travel of the armature 116 is limited by a suitably-mounted pair of stops 120 and 121.

One form of stylus, Figs. 5 and 8, consists of a cistern 122, attached by a piece 123 to the carriage 107. This cistern is connected, by means of a flexible tube 124, with a chamber 126, the lower portion of which is composed of an inverted cone, through which the ink is supplied to the paper in any suitable manner. In this modification the pendulum-rods $h$ are suspended upon a knife-edge 127, Fig. 5, in order to reduce friction to a minimum.

It is obvious that by making the receiving instrument of a larger or smaller size than the transmitter I may arrange that the picture, device, or the like when transmitted shall be of a larger or smaller size than the original picture or the like.

It is also obvious that when desired I may use in place of paper as a material upon which to receive the message, sketch, or the like a block of wood, sheet of wax, sheet of metal, or other suitable material. To enable the temporary or permanent impression to be made upon such a material, the receiving-stylus should be sharp enough to make an impression on the particular material used. The block or the like can be then employed to print from directly, or it may be used as a matrix for producing a printing-block.

The ink which I employ for the purpose of rendering the paper in the transmitting instrument conductive is by preference one containing an acid solution of platinum, copper, and other metals combined with graphite. I prefer to employ thin porous paper.

Obviously some of the features of this invention may be used without others, and therefore I do not desire to be understood as limiting myself to the details of construction and arrangement of parts herein described and illustrated, as it is manifest that the invention may be embodied in widely varying forms in the adaptation of the apparatus to various conditions of use without departing from the spirit of my improvements.

I therefore reserve the right to all such variations and modifications as properly fall within the scope of my invention and the terms of the following claims:

I claim—

1. In a telegraph system, transmitting and receiving stations, each provided with a suitably-suspended pendulum, normally held from movement, means for releasing said pendulums simultaneously to swing in one direction of movement, and means for imparting a common return impulse at the end of such movement, substantially as described.

2. In a telegraph system, transmitting and receiving stations, each provided with a suitably-suspended pendulum normally held from movement, means for releasing said pendulums simultaneously to swing in one direction of movement, and means controlled by one of said pendulums for imparting a common return impulse at the end of such movement, substantially as described.

3. In a telegraph system, transmitting and receiving stations each provided with a suitably-suspended pendulum normally held from movement, means for releasing said pendulums simultaneously to swing in one direction of movement, means for imparting a common return impulse at the end of such movement, and means separate from the starting means for imparting a fresh impulse to said pendulums when again at their starting-points, substantially as described.

4. In a telegraph system, transmitting and receiving stations each provided with a suitably-suspended pendulum normally held from movement, means for releasing said pendulums simultaneously to swing in one direction of movement, means for imparting a common return impulse at the end of such movement, and means separate from the starting means controlled by one of said pendulums for imparting a fresh impulse to said pendulums when again at their starting-points, substantially as described.

5. In a telegraph system, transmitting and receiving stations, each provided with a suitably-suspended pendulum, means for initially actuating said pendulums simultaneously in one direction of movement, means for imparting a common return impulse at the end of such movement, and means for automatically continuing the cycle, substantially as described.

6. In a telegraph system, transmitting and receiving stations each provided with a suitably-suspended pendulum, means for initially actuating said pendulums simultaneously in one direction of movement, pendulum-controlled means for imparting a common return impulse at the end of such movement, and pendulum-controlled means for automatically continuing the cycle, substantially as described.

7. In a telegraph system, transmitting and receiving stations each provided with a suitably-suspended pendulum, means for initially starting said pendulums swinging synchronously, means for automatically continuing the cycle of operation, and means for shutting down said automatic means at a predetermined period, substantially as described.

8. In a telegraph system, transmitting and receiving stations each provided with a suitably-suspended pendulum, means for initially starting said pendulums swinging synchronously, means for automatically continuing the cycle of operation, and means controlled by the transmitting-pendulums for shutting down said automatic means at a predetermined period, substantially as described.

9. In a telegraph system, transmitting and receiving stations each provided with a suitably-suspended pendulum and a writing-table controlled thereby, a motor-circuit for actuating said pendulums synchronously, a writing-circuit for operating upon said tables, and means for utilizing the motor and writing circuits alternately, substantially as described.

10. In a telegraph system, transmitting and receiving stations, each provided with a suitably-suspended pendulum and a writing-table controlled thereby, a motor-circuit for actuating said pendulums synchronously, a writing-circuit for operating upon said tables, and pendulum-controlled means for utilizing the motor and writing circuits alternately, substantially as described.

11. In a telegraph system, transmitting and receiving stations each provided with a suitably-suspended pendulum and a writing-table, connections therebetween for reciprocating said tables as the pendulums swing, and means for starting said pendulums simultaneously and means for imparting a common return impulse at the end of the rearward stroke for automatically continuing the cycle of operation, substantially as described.

12. In a telegraph system, transmitting and receiving stations each provided with a suitably-suspended pendulum and a writing-table, connections therebetween for reciprocating said tables as the pendulums swing, means for locking said pendulums in starting position, and means for releasing said locking means and starting said pendulums simultaneously and automatically continuing the cycle of operation, substantially as described.

13. In a telegraph system, transmitting and receiving stations each provided with a suitably-suspended pendulum and a writing-table, a motor-circuit, a writing-circuit, means for closing said motor-circuit to start said pendulums, means for simultaneously breaking said motor-circuit and closing said writing-circuit, and then simultaneously breaking said writing-circuit and closing said motor-circuit, and means for automatically continuing the cycle of operation, substantially as described.

14. In a telegraph system, transmitting and receiving stations each provided with a suitably-suspended pendulum and a writing-table, a motor-circuit, a writing-circuit, means for closing said motor-circuit to start said pendulums, means controlled by one of said pendulums for simultaneously breaking said motor-circuit and closing said writing-circuit and then simultaneously breaking said writing-circuit and closing said motor-circuit, and means for automatically continuing the cycle of operation, substantially as described.

15. In a telegraph system, transmitting and receiving stations each provided with a suitably-suspended pendulum and a writing-table, a motor and a writing circuit, means for closing said motor-circuit to start said pendulums, and means for simultaneously breaking and closing said motor and writing circuits respectively and then reversing the operation during one swing of the pendulums, substantially as described.

16. In a telegraph system, transmitting and receiving stations, each provided with a suitably-suspended pendulum and a writing-table, a motor and a writing circuit, means for closing said motor-circuit to start the pendulums, and means for switching in said writing-circuit during a portion only of the stroke, substantially as described.

17. In a telegraph system, transmitting and receiving stations, each provided with a suitably-suspended pendulum and a writing-table, a motor and a writing circuit, means for closing said motor-circuit to start the pendulums, and means controlled by one of said pendulums for switching in said writing-circuit during a portion only of the stroke, substantially as described.

18. In a telegraph system, transmitting and receiving stations, each provided with a suitably-suspended pendulum, means for locking said pendulums in starting position, means for initially simultaneously releasing said locking means to start the pendulums swinging, means for relocking said pendulums, and means separate from said initial means for automatically releasing said pendulums when relocked for automatically continuing the cycle of operation, substantially as described.

19. In a telegraph system, transmitting and receiving stations each provided with a suitably-suspended pendulum and a writing-table, a motor and a writing circuit, means at one station for controlling said motor-circuit and means at the other station for controlling said writing-circuit, substantially as described.

20. In a telegraph system, transmitting and receiving stations, each provided with a suitably-suspended pendulum and a writing-table, a motor and a writing circuit, means controlled by one of said pendulums for operating said motor-circuit, and means controlled by the other of said pendulums for operating said writing-circuit, substantially as described.

21. In a telegraph system, transmitting and receiving stations, each provided with a suitably-suspended pendulum and a writing-table, a motor and a writing circuit, each controlled by one of said pendulums, and means for utilizing said circuits alternately, substantially as described.

22. In a telegraph system, transmitting and receiving stations each provided with a suitably-suspended pendulum and a writing-table connected to reciprocate therewith, a style suspended over each table, means for starting said pendulums beating, and means for moving said styles in a direction transverse to the direction of reciprocation during the beat of the pendulums, substantially as described.

23. In a telegraph system, transmitting and receiving stations each provided with a suitably-suspended pendulum and a writing-table connected to reciprocate therewith, a style suspended over each table, means for starting said pendulums beating, and means for moving said styles in a direction transverse to the direction of reciprocation during one stroke only of the beat of the pendulums, substantially as described.

24. In a telegraph system, transmitting and receiving stations each provided with a suitably-suspended pendulum and a writing-table connected to reciprocate therewith, a style suspended over each table, means for starting said pendulums beating, and pendulum-controlled means for moving said styles in a direction transverse to the direction of reciprocation during the beat of the pendulums, substantially as described.

25. In a telegraph system, transmitting and receiving stations, each provided with a suitably-suspended pendulum and a writing-table connected to reciprocate therewith, a style suspended over each table, means for starting said pendulums beating, means for moving said styles in a direction transverse to the direction of reciprocation during one stroke only of the pendulum-beat, and means for withdrawing said styles from contact with said tables during the other stroke, substantially as described.

26. In a telegraph system, transmitting and receiving stations each provided with a suitably-suspended pendulum and a writing-table connected to reciprocate therewith, a style suspended over each table normally in contact therewith, means for starting said pendulums beating, and means for withdrawing said styles from contact with said tables during a portion of the beat, substantially as described.

27. In a telegraph system, transmitting and receiving stations each provided with a suitably-suspended pendulum and a writing-table connected to reciprocate therewith, a style suspended over each table normally in contact therewith, means for starting said pendulums beating, and pendulum-controlled means for withdrawing said styles from contact with said tables during a portion of the beat, substantially as described.

28. In a telegraph system, transmitting and receiving stations each provided with a suitably-suspended pendulum, hooked rods mounted to engage means on the pendulums to lock them in starting position, an electromagnet and armature therefor at each station in circuit, and a projection on each armature for engaging and releasing said rods to start said pendulums beating when said magnets are energized, substantially as described.

29. In a telegraph system, transmitting and receiving stations each provided with a suitably-suspended pendulum normally held from movement, an electromagnet at each station in circuit, means for releasing said pendulums to swing in one direction of movement and means controlled by said magnets for imparting a return impulse at the end of such movement, substantially as described.

30. In a telegraph system, transmitting and receiving stations each provided with a suitably-suspended pendulum normally held from movement, an electromagnet and armature therefor at each station in circuit, means for releasing said pendulums to swing in one direction of movement, and extensions on said armatures constructed to engage said pendulums at the end of such movement and impart a return impulse thereto when said magnets are energized, substantially as described.

31. In a telegraph system, transmitting and receiving stations each provided with a suitably-suspended pendulum normally held from movement, means for releasing said pendulums to swing in one direction of movement, and means constructed to engage said pendulums at the end of such movement and mechanically take up the impact, substantially as described.

32. In a telegraph system, transmitting and receiving stations each provided with a suitably-suspended pendulum normally held from movement, means for releasing said pendulums to swing in one direction of movement, and a species of yielding inclined plane mounted to engage said pendulums at the end of such movement and mechanically take up the impact, substantially as described.

33. In a telegraph system, transmitting and receiving stations each provided with a suitably-suspended pendulum normally held from movement, an electromagnet and armature therefor at each station in circuit, means for releasing said pendulums to swing in one direction of movement, and a species of inclined, plane yieldingly mounted on said armature and adapted to engage said pendulums at the end of said movement and mechanically take up the impact, substantially as described.

34. In a telegraph system, transmitting and receiving stations each provided with a suitably-suspended pendulum normally held from movement, an electromagnet at each station in circuit, means for initially momentarily energizing said magnets to release said pendulums to swing in one direction of movement, means for again energizing said magnets during such movement, and means controlled by said magnets for imparting a return impulse to said pendulums at the end of such movement, substantially as described.

35. In a telegraph system, transmitting and receiving stations each provided with a suitably-suspended pendulum normally held from movement, an electromagnet at each station in circuit, means for initially momentarily energizing said magnets to release said pendulums to swing in one direction of movement, pendulum-controlled means for again energizing said magnets during such movement, and means controlled by said magnets for imparting a return impulse to said pendulums at the end of such movement, substantially as described.

36. In a telegraph system, transmitting and receiving stations each provided with a suitably-suspended pendulum normally held from movement, an electromagnet at each station in circuit, means for initially momentarily energizing said magnets to release said pendulums to swing in one direction of movement, means for again energizing said magnets during such movement, means controlled by said magnets for imparting a return impulse to said pendulums at the end of such movement, and means for again deënergizing said magnets during the return stroke, substantially as described.

37. In a telegraph system, transmitting and receiving stations each provided with a suitably-suspended pendulum normally held from movement, an electromagnet at each station in circuit, means for initially momentarily energizing said magnets to release said pendulums to swing in one direction of movement, pendulum-controlled means for again energizing said magnets during such movement, means controlled by said magnets for imparting a return impulse to said pendulums at the end of such movement, and pendulum-controlled means for again deënergizing said magnets during the return stroke, substantially as described.

38. In a telegraph system, transmitting and receiving stations each provided with a suitably-suspended pendulum and a writing-table connected to reciprocate therewith, threaded shafts mounted transversely over said tables, a sliding carriage at each station carrying a style mounted to engage said threaded shafts, and connecting means between said shafts and pendulums to rotate the former as the latter beat, whereby said styles are given a movement along said shafts, substantially as described.

39. In a telegraph system, transmitting and receiving stations each provided with a suitably-suspended pendulum and a writing-table connected to reciprocate therewith, threaded shafts mounted transversely over said tables, a sliding carriage at each station carrying a style mounted to engage said threaded shafts, ratchet-wheels on said shafts, and looped rods on said pendulums mounted to engage and rotate said ratchet-wheels as the pendulums beat whereby said styles are given a movement along said shafts, substantially as described.

40. In a telegraph system, a transmitting instrument provided with a suitably-suspended pendulum and a writing-table connected to reciprocate therewith, a frame having a style suitably suspended therefrom mounted over said table, said suspending means constructed to be engaged and actuated by said pendulums at the end of one direction of movement, and means mounted on said suspending means adapted to engage said frame and raise said style from said table when said suspending means are actuated by contact with the pendulums, substantially as described.

41. In a telegraph system, a transmitting instrument provided with a suitably-suspended pendulum and a writing-table connected to reciprocate therewith, a frame mounted over said table, a lever pivoted in said frame, a style suspended from one end of said lever, its other end projecting into the path of movement of said pendulum, a hooked rod mounted on said lever, and means on said frame with which said rod is adapted to engage to raise said style from said table when said lever is actuated by contact with the pendulum, substantially as described.

42. In a telegraph system, a transmitting instrument comprising a framework having a pendulum suspended therein, a normally open electric circuit, mechanism for closing the circuit, means in circuit for initially actuating said pendulum by closing said circuit, means for opening the circuit during the beat, and a swinging frame mounted on the framework constructed to be actuated by contact with said pendulum and to engage said circuit-closing mechanism to again close the circuit and impart another forward impulse to said pendulum, substantially as described.

43. In a telegraph system, a transmitting instrument comprising a framework having a pendulum suspended therein, a normally open electric circuit, mechanism for closing the circuit, means in circuit for initially actuating said pendulum by closing said circuit, means controlled by said pendulum for opening the circuit during the beat, and a swinging frame mounted on the framework constructed to be actuated by contact with said pendulum and to engage said circuit-closing mechanism to again close the circuit and impart another forward impulse to said pendulum, substantially as described.

44. In a telegraph system, a transmitting instrument comprising a framework having a pendulum suspended therein, a normally open electric circuit, mechanism for closing the circuit, means in circuit for imparting an impulse to said pendulum when said circuit is closed, means independent of said circuit-closing mechanism for momentarily closing the circuit to initially actuate said pendulum, means for actuating said circuit-closing mechanism at the end of the forward stroke and opening it again during the return stroke, and a swinging frame mounted on the framework constructed to be actuated by contact with said pendulum and to engage said circuit-closing mechanism to again close the circuit and impart another impulse to said pendulum, substantially as described.

45. In a telegraph system, a transmitting instrument comprising a framework having a pendulum suspended therein, a normally open electric circuit, means in circuit for imparting an impulse to said pendulum when said circuit is closed, a rock-shaft, mechanism for closing the circuit, means on said shaft for engaging and actuating said circuit-closing mechanism when the same is rocked in one direction, and means independent of said shaft for engaging and actuating said circuit-closing mechanism when again opened by rocking the shaft in the opposite direction, substantially as described.

46. In a telegraph system, a transmitting instrument comprising a framework having a pendulum suspended therein, a normally open electric circuit, means in circuit for imparting an impulse to said pendulum when said circuit is closed, a pendulum-controlled rock-shaft, mechanism for closing the circuit, means on said shaft for engaging and actuating said circuit-closing mechanism when the same is rocked in one direction, and means independent of said shaft for engaging and actuating said circuit-closing mechanism when again opened by rocking the shaft in the opposite direction, substantially as described.

47. In a telegraph system, a transmitting instrument comprising a framework having a pendulum suspended therein, a normally open electric circuit, means in circuit for imparting an impulse to said pendulum when said circuit is closed, a rock-shaft, mechanism for closing the circuit, means on said shaft for engaging and actuating said circuit-closing mechanism when the same is rocked in one direction, and a swinging frame mounted on the framework actuated by contact with said pendulum for engaging and actuating said circuit-closing mechanism when again opened by rocking the shaft in the opposite direction, substantially as described.

48. In a telegraph system, a transmitting instrument comprising a framework having a pendulum suspended therein, an electric circuit, a mercury-cup and contact-lever normally out of contact therewith in circuit, means in circuit for imparting an impulse to said pendulum when said circuit is closed, means for momentarily closing the circuit to initially start said pendulum beating, and means actuated by contact with said pendulum for engaging and actuating said contact-lever to close the circuit and impart another impulse to said pendulum, substantially as described.

49. In a telegraph system, a transmitting instrument comprising a framework having a pendulum suspended therein, an electric circuit, a mercury-cup and contact-lever normally out of contact therewith in circuit, means in circuit for imparting an impulse to said pendulum when said circuit is closed, means for momentarily closing the circuit to initially start said pendulum beating, and a swinging frame mounted on the framework actuated by contact with said pendulum for engaging and actuating said contact-lever to close the circuit and impart another impulse to said pendulum, substantially as described.

50. In a telegraph system, a transmitting instrument comprising a framework having a pendulum suspended therein, an electric circuit, a mercury-cup and contact-lever normally out of contact therewith in circuit, means in circuit for imparting an impulse to said pendulum when said circuit is closed, means for momentarily closing the circuit to initially start said pendulum in one direction of movement, means for closing the circuit at the end of such movement and opening it again during the return stroke, and means independent of said last-named means for again closing the circuit when said pendulum reaches its starting position, substantially as described.

51. In a telegraph system, a transmitting instrument comprising a framework having a pendulum suspended therein, an electric circuit, a mercury-cup and contact-lever normally out of contact therewith in circuit, means in circuit for imparting an impulse to said pendulum when said circuit is closed, means for momentarily closing the circuit to initially start said pendulum in one direction of movement, a rock-shaft having a pawl constructed to engage and actuate said contact-lever when said shaft is rocked in one direction, means on the pendulum for rocking said shaft into circuit-closing position at the end of such movement and back again during the return stroke, and a swinging frame mounted on the framework actuated by contact with said pendulum for engaging and again actuating said contact-lever when said pendulum again reaches its starting position, substantially as described.

52. In a telegraph system, a transmitting instrument comprising a framework having a pendulum suspended therein, a writing-table, a style, means for moving said style transversely of the table, means for initially starting said pendulum beating, means for automatically continuing the cycle of operation, and means controlled by the movement of said style for shutting down said automatic means at a predetermined period, substantially as described.

53. In a telegraph system, a transmitting instrument comprising a framework having a pendulum suspended therein, a writing-table, a style, means for moving said style transversely of the table, means for initially starting said pendulum beating, means for automatically continuing the cycle of operation, and a pivoted stop for shutting down said automatic means connected to said style and brought into position by the movement thereof, substantially as described.

54. In a telegraph system, a receiving instrument comprising a framework having a pendulum suspended therein, a writing-table connected to reciprocate therewith, a style for said table, a motor-circuit and a writing-circuit both normally open, means in the motor-circuit for imparting an impulse to the pendulum when said circuit is closed, means in the writing-circuit for causing said style to contact with said table when said circuit is closed, means for closing the motor-circuit to start the pendulum beating, and means for closing and later opening said writing-circuit during one stroke of the beat, substantially as described.

55. In a telegraph system, a receiving instrument comprising a framework having a pendulum suspended therein, a writing-table connected to reciprocate therewith, a style for said table, a motor-circuit and a writing-circuit both normally open, means in the motor-circuit for imparting an impulse to the pendulum when said circuit is closed, means in the writing-circuit for causing said style to contact with said table when said circuit is closed, comprising an electromagnet and armature therefor operatively connected with said style, means for closing the motor-circuit to start the pendulum beating, and means for energizing and later deënergizing said magnet during one stroke of the beat, substantially as described.

56. In a telegraph system, a receiving instrument comprising a framework having a pendulum suspended therein, a writing-table connected to reciprocate therewith, a style for said table, a motor-circuit and a writing-circuit both normally open, means in the motor-circuit for imparting an impulse to the pendulum when said circuit is closed, means in the writing-circuit for causing said style to contact with said table when said circuit is closed, means for closing the motor-circuit to start the pendulum beating, a rock-shaft connected to break the motor-circuit and close the writing-circuit on one direction of its movement and reverse the operation on the other, and means for rocking said shaft during one stroke of the pendulum beat, substantially as described.

57. In a telegraph system, a receiving instrument comprising a framework having a pendulum suspended therein, a writing-table connected to reciprocate therewith, a style for said table, a motor-circuit and a writing-circuit both normally open, means in the motor-circuit for imparting an impulse to the pendulum when said circuit is closed, means in the writing-circuit for causing said style to contact with said table when said circuit is closed, means for closing the motor-circuit to start the pendulum beating, a rock-shaft connected to break the motor-circuit and close the writing-circuit on one direction of its movement, and reverse the operation on the other, and pendulum-controlled means for rocking said shaft during one stroke of the pendulum beat, substantially as described.

In testimony whereof I affix my signature in presence of two witnesses.

HENRY CHARLES BRAUN.

Witnesses:
A. BROWN,
A. E. VIDAL.